(12) United States Patent
Sausset et al.

(10) Patent No.: US 12,486,870 B2
(45) Date of Patent: Dec. 2, 2025

(54) BEARING AND ASSOCIATED SENSOR BEARING UNIT

(71) Applicant: Aktiebolaget SKF, Gothenburg (SE)

(72) Inventors: Vincent Sausset, Azay-le-Rideau (FR); Sylvain Chaussat, Mont-Pres-Chambord (FR); Nicolas Guinamard, Menthonnex Sous Clermont (FR)

(73) Assignee: Aktiebolaget SKF, Gothenburg (SE)

( * ) Notice: Subject to any disclaimer, the term of this patent is extended or adjusted under 35 U.S.C. 154(b) by 48 days.

(21) Appl. No.: 18/221,252

(22) Filed: Jul. 12, 2023

(65) Prior Publication Data
US 2024/0026930 A1 Jan. 25, 2024

(30) Foreign Application Priority Data
Jul. 20, 2022 (DE) .......................... 102022207414.9

(51) Int. Cl.
*F16C 35/06* (2006.01)
*F16C 19/06* (2006.01)
*F16C 33/58* (2006.01)
*F16C 41/00* (2006.01)

(52) U.S. Cl.
CPC .............. *F16C 35/06* (2013.01); *F16C 19/06* (2013.01); *F16C 33/586* (2013.01); *F16C 41/007* (2013.01); *F16C 2226/36* (2013.01)

(58) Field of Classification Search
CPC ........ F16C 19/06; F16C 33/586; F16C 35/06; F16C 41/00; F16C 41/007; F16C 2226/36; G01P 3/443; G01P 3/446
See application file for complete search history.

(56) References Cited

U.S. PATENT DOCUMENTS

| | | | |
|---|---|---|---|
| 3,405,982 A * | 10/1968 | Krenn .................... | F16C 35/02 384/537 |
| 9,435,380 B2 * | 9/2016 | Suzuki .................. | F16C 35/063 |
| 2014/0155210 A1 * | 6/2014 | Ichikawa .............. | F16C 33/581 474/174 |

(Continued)

FOREIGN PATENT DOCUMENTS

| FR | 2884367 B1 | 9/2007 |
|---|---|---|
| JP | 2009041644 A * | 2/2009 |

OTHER PUBLICATIONS

Machine Translation of JP-2009041644-A (Year: 2009).*

*Primary Examiner* — Alan B Waits
(74) *Attorney, Agent, or Firm* — Stinson LLP

(57) ABSTRACT

The bearing comprises a first ring (16) and a second ring (18) centered on an axis, each of the first and second rings being provided with an outer cylindrical surface (16b), with an inner cylindrical surface (16a), and with lateral faces (16c) which axially delimit the outer and inner cylindrical surface. One of the inner and outer cylindrical surfaces (16a) and/or one of the lateral faces (16d) of the first ring comprise a textured area (40, 42) provided with at least two first and second parallel grooves extending radially and axially, with a single inner protrusion disposed between and along the two parallel first and second grooves, with a first lateral outer protrusion disposed alongside the first groove, and with a second lateral protrusion disposed alongside the second groove, the first and second lateral outer protrusions extending respectively along the first and second grooves.

39 Claims, 6 Drawing Sheets

(56) References Cited

U.S. PATENT DOCUMENTS

| | | | |
|---|---|---|---|
| 2014/0254970 A1* | 9/2014 | Guilford | F16C 43/065 29/898.064 |
| 2015/0204385 A1* | 7/2015 | Sausset | G01P 3/443 384/448 |
| 2018/0128320 A1* | 5/2018 | Chaussat | G01D 5/12 |
| 2021/0164521 A1* | 6/2021 | Marchis | F16C 43/04 |
| 2022/0349913 A1* | 11/2022 | Sausset | G01P 3/443 |

* cited by examiner

BEARING AND ASSOCIATED SENSOR BEARING UNIT

CROSS-REFERENCE TO RELATED APPLICATION

This application claims priority to German Application No. 102022207414.9, filed Jul. 20, 2022, the entirety of which is hereby incorporated reference.

FIELD

The present disclosure relates to a bearing.

The present disclosure also relates to a sensor bearing unit comprising a bearing and an impulse ring.

BACKGROUND

Today, sensor bearing units are commonly used in a wide range of technical fields, for example in automotive industry and aeronautics. These units provide high quality signals and transmissions, while allowing integration in simpler and more compact apparatus.

Such a sensor bearing unit generally comprises a bearing, an impulse ring, and detection means facing the impulse ring. For example, the impulse ring is provided with a target holder and with a magnetized target fixed to the target holder beyond the outer ring of the bearing.

The magnetic target includes alternating North and South poles, whose number depends on bearing size, detection precision and particular application. The detection means may be fixed to the outer ring of the bearing or to a fixed casing.

In a first type of impulse ring, the target holder comprises a flange provided with an outer tubular portion onto which the magnetic target is attached, and with an inner tubular portion secured into an annular groove made in the bore of the inner ring in order to prevent the rotation of the impulse ring relative to the inner ring. For more details, it is possible for example to refer to the patent FR 2,884,367.

In a second type of impulse ring, the target holder of the impulse ring is further provided with a fixing sleeve supporting the flange and secured to the inner ring. The sleeve comprises an annular axial portion secured into the annular groove of the inner ring and a radial collar extending radially outwards the axial portion, the flange being axially mounted between the inner ring of the bearing and the radial collar of the sleeve.

Similarly to the first type of impulse ring, the axial portion of the sleeve is secured into the annular groove of the inner ring in order to prevent the rotation of the impulse ring relative to the inner ring.

It is essential that the impulse ring is fixedly connected in rotation with the bearing inner ring to which it is attached.

In some cases, due to high speeds, high accelerations, vibrations, thermal dilatation or high mechanical loads, there is a significant risk that the angular mechanical connection between the impulse ring and the inner ring holding it becomes partially or totally loose, permanently or randomly. Should such a failure occur, the signal measured by the detection means would not correspond to the real position or speed or acceleration of the inner ring of the bearing with respect to the outer ring.

Therefore, there is a need to provide a sensor bearing unit with improved angular connection between the impulse ring and the associated bearing inner ring.

More generally, there is also a need to provide a bearing adapted to enhance the angular connection with an additional part intended to be mounted on the inner or outer ring.

SUMMARY

The disclosure relates to a bearing comprising a first ring and a second ring centered on an axis, each of the first and second rings being provided with an outer cylindrical surface, with an inner cylindrical surface, and with lateral faces which axially delimit the outer and inner cylindrical surface.

According to a general feature, one of the inner and outer cylindrical surfaces and/or one of the lateral faces of the first ring comprise a textured area. The textured area is provided with at least two parallel first and second grooves extending radially or axially, with a single inner protrusion disposed between and along the two parallel first and second grooves, with a first lateral outer protrusion disposed alongside the first groove, and with a second lateral protrusion disposed alongside the second groove. The first and second lateral outer protrusions extend respectively along the first and second grooves.

A "textured area" refers to a part that has different surface-state features from the rest of the associated cylindrical surface or lateral face.

In a first embodiment, only the inner or outer cylindrical surface of the first ring comprises a textured area.

In a second alternative embodiment, only one of the lateral faces of the first ring comprise a textured area.

In a third alternative embodiment, both one of the inner and outer cylindrical surfaces and one of the lateral faces of the first ring are provided with a textured area.

With such textured area provided on one of the lateral face and/or one of the cylindrical surfaces of the first ring, the angular connection with the additional part intended to be mounted on this ring is improved. As a matter of fact, the breaking torque between the additional part and the first ring increases with the protrusions of the textured area.

Advantageously, the textured area is formed by local deformation of said cylindrical surface or said lateral face, for example by laser. In this case, the first ring is provided with a laser textured area.

The textured area may have a linear shape extending radially or axially.

The height of the single inner protrusion of the textured area may be bigger than the height of the first and second outer lateral protrusions.

The width of the single inner protrusion of the textured area may be bigger than the width of the first and second lateral outer protrusions.

The height of the first and second lateral outer protrusions of the textured area may range between 10 μm and 50 μm, and preferably between 15 μm and 38 μm. The width of the first and second lateral outer protrusions may range between 10 μm and 40 μm, and preferably between 15 μm and 35 μm.

Preferably, the space between the single inner protrusion and any one of the first or second lateral outer protrusions of the textured area, at their top, is less than or equal to 60 μm. With such a spacing, the material embrittlement of the first ring is limited.

The disclosure also relates to a sensor bearing unit comprising a bearing as previously defined and an impulse ring provided with a target holder and with a target mounted on the target holder. The target holder is axially mounted against said lateral face of the first ring and comprises an axial fixing portion secured to the first ring and coming into radial contact with said cylindrical surface of the first ring.

In a first embodiment, the target holder of the impulse ring comprises at least a flange onto which is mounted the target, the flange comprising an axial portion forming the axial fixing portion of the target holder.

The flange of the target holder may further comprise a radial portion extending at least radially the axial portion and coming into axial contact with said lateral face of the first ring.

In a second embodiment, the flange of the target holder further comprises a radial portion extending radially the axial portion, the target holder further comprising a washer axially interposed between the radial portion of the flange and said lateral face of the first ring.

In a third embodiment, the target holder of the impulse ring comprises at least a flange onto which is mounted the target and a sleeve, the sleeve comprising an axial portion forming the axial fixing portion of the target holder, the flange being axially interposed between said lateral face of the first ring and the sleeve and being radially mounted around said sleeve.

The disclosure also relates to a method for manufacturing a bearing as previously defined.

The method comprises the following successive steps: forming the first groove of textured area with two first lateral protrusions disposed one on each side of the first groove and extending along said first groove; forming the second groove with two second lateral protrusions disposed one on each side of the second groove and extending along said second groove, the second groove being formed close enough to the first groove so that the second lateral protrusion of the second groove which is closest to the first groove covers in part one of the first lateral protrusions; and merging by welding the second lateral protrusion that covers in part one of the first lateral protrusion with said one of the first lateral protrusion to form the single inner protrusion.

BRIEF DESCRIPTION OF THE DRAWINGS

The present disclosure and its advantages will be better understood by studying the detailed description of specific embodiments given by way of a non-limiting examples and illustrated by the appended drawings on which.

DETAILED DESCRIPTION

Figure 1:
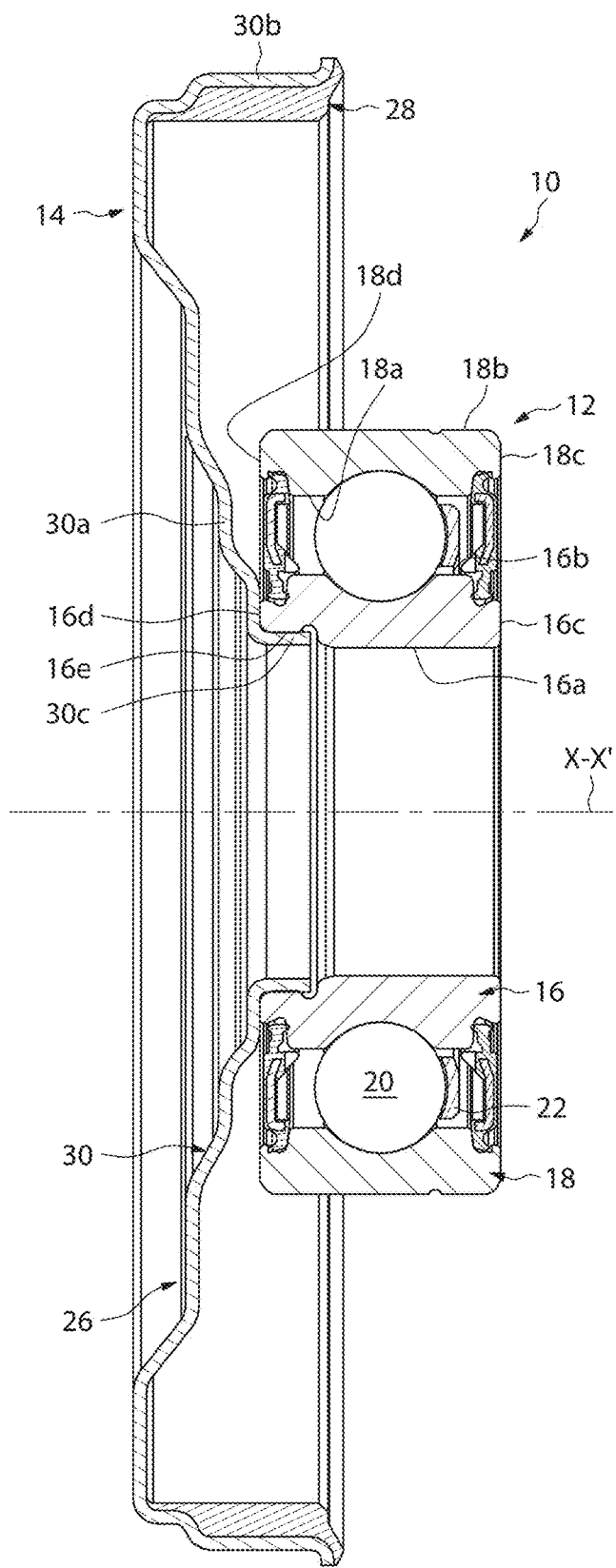
FIG. 1 is an axial section view of a sensor bearing unit according to a first example of the disclosure.

The sensor bearing unit 10 represented on FIG. 1 is adapted to equip an apparatus such as a motor, a brake system, a suspension system or any rotating machine, in particular for an automotive vehicle.

The sensor bearing unit 10 comprises a bearing 12 and an impulse ring 14 mounted on the bearing. The bearing 12 is intended to be mounted on a shaft (not shown) of the apparatus for tracking the rotation of the shaft.

The bearing 12 comprises a first ring 16 and a second ring 18. In the illustrated example, the first ring 16 is the inner ring whereas the second ring 18 is the outer ring. The inner and outer rings 16, 18 are concentric and extend axially along the bearing rotation axis X-X' which runs in an axial direction. The inner and outer rings 16, 18 are made of steel.

In the illustrated example, the bearing 12 also comprises a row of rolling elements which are provided here in the form of balls, interposed between raceways (not referenced) formed on the inner and outer rings 16, 18. The rolling bearing 10 also comprises a cage 22 for maintaining the regular circumferential spacing of the rolling elements 20.

The inner ring 16 of the bearing is mounted on the outer surface of the shaft of the apparatus. The inner ring 16 is intended to rotate while the outer ring 18 is intended to be fixed. The outer ring 18 can be mounted in a fixed support member or housing, belonging to the apparatus.

The outer ring 18 is provided with a cylindrical inner surface or bore 18a and with an outer cylindrical surface 18b which is radially opposite to the bore 18a. A toroidal circular raceway for the rolling elements 20 is formed from the bore 18a, said raceway being directed radially inwards. The outer ring 18 is also provided with two opposite radial lateral faces 18c, 18d which axially delimit the bore 18a and the outer surface 18b of said ring.

Similarly to the outer ring 18, the inner ring 16 is provided with a cylindrical inner surface or bore 16a and with an outer cylindrical surface 16b which is radially opposite to the bore 16a. A toroidal circular raceway for the rolling elements 20 is formed from the outer cylindrical surface 16b, said raceway being directed radially outwards.

The inner ring 16 also is also provided with two opposite radial lateral faces 16c, 16d which axially delimit the bore 16a and the outer surface 16b of said ring.

The inner ring 16 further comprises a cylindrical groove 16e made in the bore 16a. The groove 16e is centered on the axis X-X'. Diameter of bore 16a is smaller than diameter of groove 16e. The groove 16e opens on the radial lateral face 16d.

As will be described later, the lateral face 16d and the bore 16a of the inner ring each comprise a textured region or area to increase the breaking torque between the inner ring and the impulse ring 14.

The impulse ring 14 is mounted on the inner ring 16. The impulse ring 14 comprises an annular target holder 26 and a target 28 mounted on said target holder. In this example, the target holder 26 only comprises a flange 30 onto which is mounted the target 28.

The flange 30 is axially secured to the inner ring 16 of the bearing. The flange 30 is mounted into the bore 16a of the inner ring of the bearing. The flange 30 is axially mounted against the lateral face 16d of the inner ring. In the disclosed example, the flange 30 is made in one part. The flange 30 is made of metal.

The flange 30 comprises an annular radial portion 30a, an outer annular axial portion 30b radially surrounding the bearing 12, and an inner axial portion 30c secured to the inner ring 16 and defining the bore of the flange.

The outer axial portion 30b is located radially above the outer ring 18 of the bearing. The outer axial portion 30b extends radially a large-diameter edge of the radial portion 30a.

The radial portion 30a of the flange extends between the outer and inner axial portions 30b, 30c. The axial portion 30c extends axially inwards from the radial portion 30a. The axial portion 30c extends axially from a small-diameter edge of the radial portion 30a. Here, the inner axial portion 30c extends purely axially.

The radial portion 30a of the flange axially abuts against the radial lateral face 16d of the inner ring. The radial portion 30a substantially extends radially from the axial portion 30c. In the illustrated example, the radial portion 30a of the flange is provided with frustoconical parts inclined with respect to the axis X-X' towards the opposite direction of the bearing 12. Frustoconical parts prevent any interference between the flange 30 and the outer ring 18 of the bearing.

The flange 30 is axially secured to the inner ring 16 by means of the inner axial portion 30c. The inner axial portion 30c forms a fixing portion of the target holder. The axial portion 30c is mounted into the bore 16a of the inner ring of the bearing. The axial portion 30c comes into radial contact with the bore 16a.

The inner portion 30c is secured into the bore 16a. More precisely, the inner portion 30c is mounted and secured into the groove 16e of the bore. For example, the inner portion 30c of the flange may be secured into the bore 16a of the inner ring 16e, by axial press-fitting. Alternatively, the inner axial portion 30c of the target holder may be secured into the bore 16a by snapping, by gluing, by welding, by radial crimping or any other appropriate means.

The target 28 is mounted on the outer axial portion 30b of the flange. In the disclosed example, the target 28 is mounted into the bore of the outer axial portion 30b. Alternatively, the target 28 may be mounted on the outer surface of the outer axial portion 30b.

In one embodiment, the target 28 includes magnetic North and South alternated poles. The target 28 is multi-polarly magnetized in the circumferentially direction. The target 28 may be a plastic molded part. The target 28 may be over-molded onto the flange 30. Alternatively, the target 28 may be separately formed and secured onto the flange 30 by any appropriate means, for example by bonding or by press-fitting. The target 28 may be formed of a rubber material with magnetic powder, or of a magnetic alloy or of a plasto-ferrite or of an elasto-ferrite.

Detection means (not shown) are associated with the target 28 for tracking the rotation of the impulse ring 14 and the inner ring 16 around the axis X-X'. The detection means are disposed to radially face the inner surface of the target 28. For example, the detection means may include Hall-effect sensors. The target 28 is a radial target. Alternatively, the target may be an axial target.

As an alternative, the target 28 and the detection means may use any other suitable technology instead of magnetic technology. For example, induction technology or optic technology may be implemented.

Figure 2:
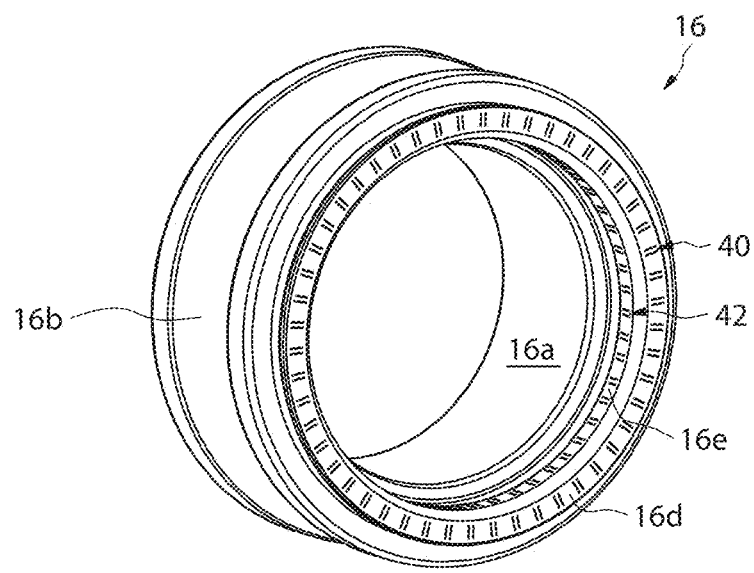
FIG. 2 is a perspective view of the inner ring of a bearing of the sensor bearing unit of FIG. 1.

As previously mentioned and shown on FIG. 2, the lateral face 16d and the bore 16a of the inner ring each comprise a textured area 40, 42.

Each textured area 40, 42 extends radially or axially on the associated lateral face 16d or bore 16a. In the illustrated example, each textured area 40, 42 is provided on the whole associated face 16d or bore 16a. Alternatively, at least one of the textured areas 40, 42 may extend over a limited angular sector, for example ranging between 200° and 300°.

Figure 3:
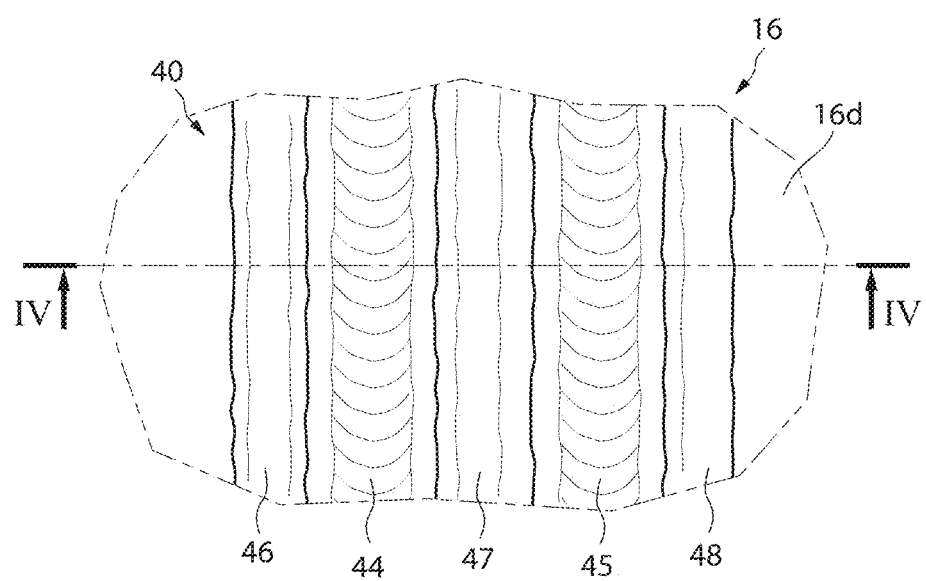
FIG. 3 is a detail view of FIG. 2.
Figure 4:
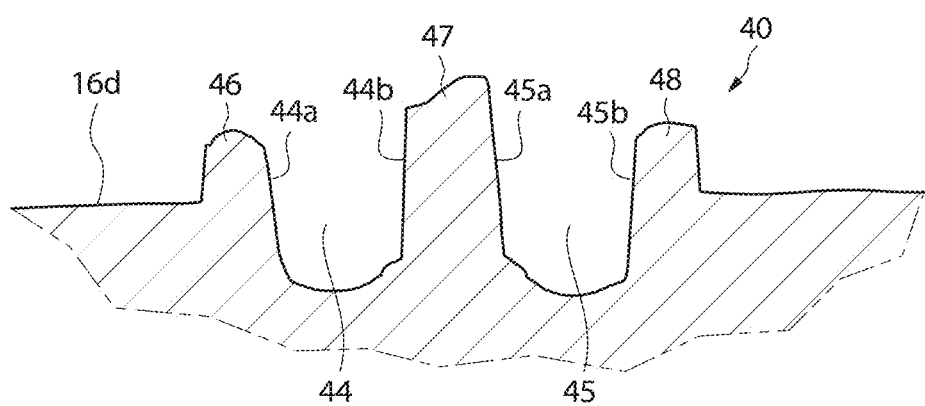
FIG. 4 is a section on IV-IV of FIG. 3.

As shown more clearly on FIGS. 3 and 4, the textured area 40 formed on the lateral face 16d of the inner ring is provided with at least two parallel first and second grooves 44, 45 that extend radially. A first lateral outer protrusion 46 is disposed alongside the first groove 44. A single inner protrusion 47 is disposed between and along the two first and second parallel grooves 44, 45. A second lateral outer protrusion 48 is disposed alongside the second groove 45. The first and second lateral outer protrusions 46, 48 extend respectively along the first and second grooves 44, 45 on the side opposite to the inner protrusion 47. The first and second grooves 44, 45, the single inner protrusion 47, and the lateral outer protrusions 46, 48 form together the textured area 40.

The first and second grooves 44, 45 are each delimited by two spaced side walls 44a, 44b and 45a, 45b facing each other, respectively. The first and second grooves 44, 45 are oriented axially outwards.

The depth of the first and second grooves 44, 45 may be constant or variable along the length of the said grooves. The width of the first and second grooves 44, 45 may be constant or variable along the length of the said grooves. For example, the depth of the first groove 44 may be greater or equal to the height of the first and second lateral outer protrusions 46, 48. For example, the depth of the groove 44 may range between 25 µm and 65 µm.

Each protrusion 46, 47 extends continuously in the radial direction along the first groove 44. Each protrusion 47, 48 extends continuously in the radial direction along the second groove 45. Each protrusion 46, 47, 48 protrudes axially outwards from the lateral face 16d of the inner ring. The first groove 44 is flanked over its entire length by the first lateral outer protrusion 46 on one side and by the single inner protrusion 47 on the other side. The second groove 45 is flanked over its entire length by the single inner protrusion 47 on one side and by the second lateral outer protrusion 48 on the other side. The first lateral outer protrusion 46 extends the side wall 44a of the first groove 44. The single inner protrusion 47 extends both the side wall 44b of the first groove 44 and the side wall 45a of the second groove 45. The second lateral outer protrusion 48 extends the side wall 45b of the second groove 45.

The height of each protrusion 46, 47, 48 may be constant or variable along the length of the protrusion. The width of each protrusion 46, 47, 48 may be constant or variable along the length of the groove.

For example, the height of the first and second lateral outer protrusions 46, 48 may range between 10 µm and 50 µm, and preferably between 15 µm and 38 µm. The width of the first and second lateral outer protrusions 46, 48 may range between 10 µm and 40 µm, and preferably between 15 µm and 35 µm. The space at their top between the single inner protrusion 47 and any one of the first or second lateral outer protrusions 46, 48 is less than or equal to 60 µm.

In the illustrated example, the first and second grooves 44, 45 and the protrusions 46, 47, 48 extend radially over the lateral face 16d of the inner ring. The first lateral outer protrusion 46 and the first groove 44 are formed simultaneously by local deformation of the material of the lateral face 16d of the inner ring caused by impact, preferably by the impact of a laser beam. Similarly, the second lateral outer protrusion 48 and the second groove 45 are formed simultaneously by local deformation of the material of the lateral face 16d of the inner ring caused by impact, preferably by the impact of a laser beam.

As will be explained in more detail later, formation of the single inner protrusion 47 is initiated during the formation of first and second grooves 44 and 45, and is finalized in a subsequent step by welding.

Referring once again to FIG. 2, the textured area 42, which is formed on the cylindrical bore 16a of the inner ring, is similar to the previously described textured area 40 with two parallel first and second grooves, one single inner protrusion, and two lateral outer protrusions. More precisely, the textured area 42 is formed on the groove 16e of the bore 16a of the inner ring. The grooves of the textured area 42 extend from the bore 16a and the protrusions protrude from the bore. The grooves are oriented radially inwards and each protrusion protrudes radially.

The protrusions 46, 47, 48 of the textured area 40 formed on the lateral face 16d of the inner ring come into contact with the radial portion 30a (FIG. 1) of the flange of the impulse ring 14. The protrusions of the textured area 42 formed on the bore 16a of the inner ring come into contact with the inner axial portion 30c of the flange of the impulse ring.

The textured areas 40, 42 increase the friction torque between the inner ring 16 and the impulse ring 14. The angular connection between the impulse ring 14 and the inner ring 16 is therefore improved.

Figure 5:
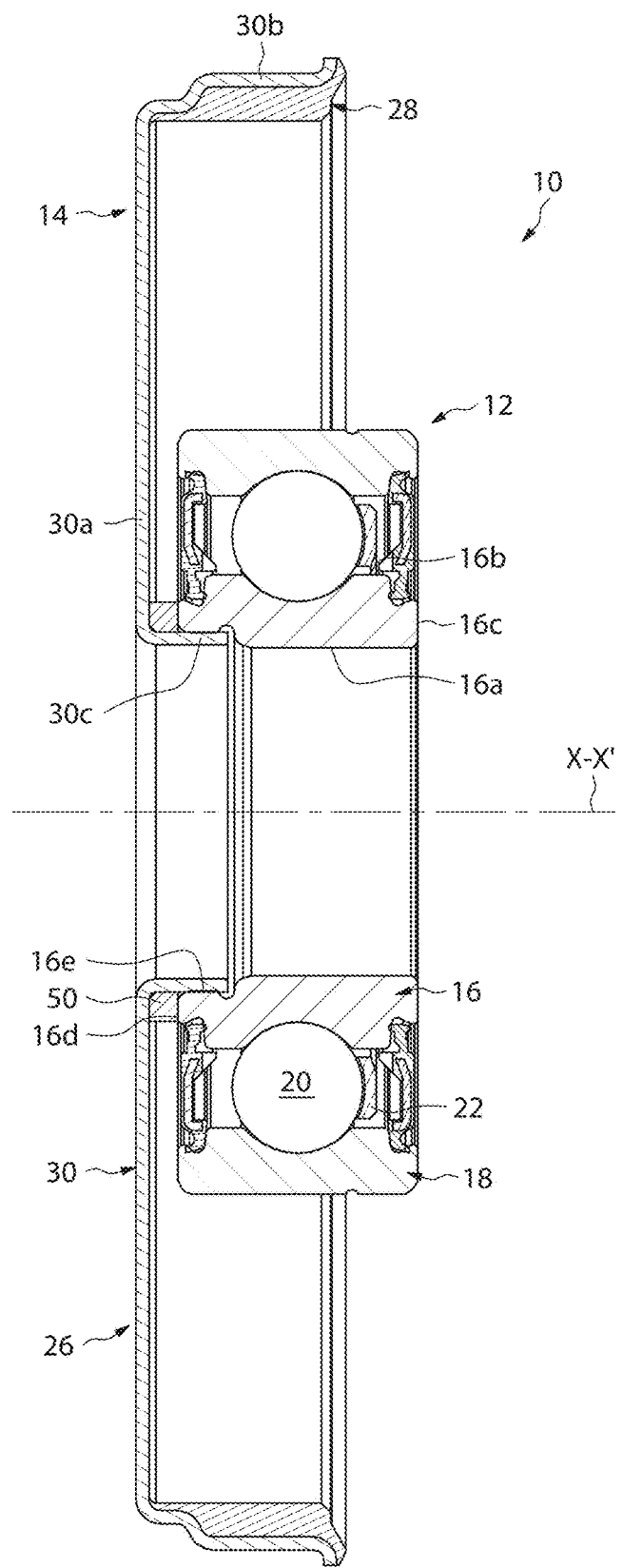
FIG. 5 is an axial section view of a sensor bearing unit according to a second example of the disclosure.

The second example shown on FIG. 5, in which identical part are given identical references, mainly differs from the first example in that the target holder 26 comprises the flange 30 onto which is mounted the target 28, and a washer 50 axially interposed between the radial portion 30a of the flange and the inner ring 16. The washer 50 is distinct from the flange 30.

The washer 50 is axially interposed between the radial portion 30a of the flange and the lateral face 16d of the inner ring. The washer 50 is in axial contact against the lateral face 16d of the inner ring on one side and in axial contact with the radial portion 30a of the flange on the other side. The washer 50 is mounted radially around the inner axial portion 30c of the flange.

The washer 50 is a spacer for axially shifting the flange 30 relative to the outer ring 16 of the bearing in order to avoid interferences therebetween. Accordingly, with regard to the first example, the radial portion 30a of the flange may have a simplified shape. In the illustrated example, the radial portion 30a of the flange extends purely radially.

Similarly to the first example, the lateral face 16d and the bore 16a of the inner ring are provided with the textured areas. In this example, the protrusions of the textured area provided on the lateral face 16d comes into contact with the washer 50 of the target holder.

Figure 6:
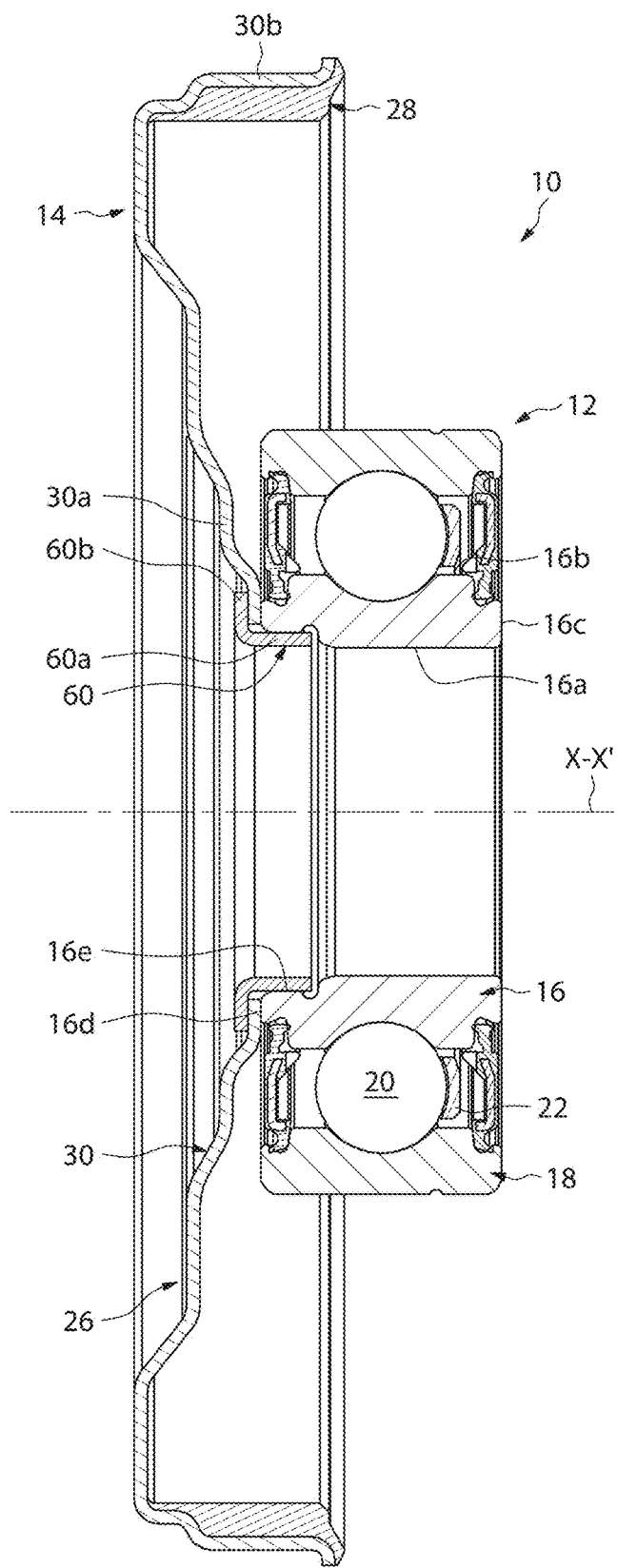
FIG. 6 is an axial section view of a sensor bearing unit according to a third example of the disclosure.

The third example shown on FIG. 6, in which identical part are given identical references, differs from the first example in that the target holder 26 comprises the flange 30 onto which is mounted the target 28, and a fixing sleeve 60 secured to the inner ring 16. In this example, the sleeve 60 forms a fixing portion of the target holder 26.

The flange 30 is axially secured to the inner ring 16 of the bearing by means of the sleeve 60. In this example, the flange 30 is deprived of the inner axial portion 30c. The radial portion 30a defines the bore of the flange 30.

The flange 30 is axially mounted between the lateral face 16d of the inner ring and the sleeve 60. The flange 30 is mounted radially around the sleeve 60. The radial portion 30a of the flange is axially interposed and clamped between the lateral face 16d of the inner ring and the sleeve 60. The flange 30 is in axial contact against the lateral face 16d of the inner ring on one side and in axial contact with the sleeve 60 on the other side.

The sleeve 60 is axially secured to the inner ring 16. The sleeve 60 is mounted into the bore 16a of the inner ring of the bearing. The sleeve 60 is secured into the bore 16a. More precisely, the sleeve 60 is mounted and secured into the groove 16e of the bore. For example, the sleeve 60 may be secured into the bore 16a of the inner ring 16e, by axial press-fitting. Alternatively, the sleeve 60 may be secured into the bore 16a by snapping, by gluing, by welding, by radial crimping or any other appropriate means. In the disclosed example, the sleeve is made in one part. The sleeve 60 is made of metal.

The sleeve 60 comprises an annular axial portion 60a defining the bore of the sleeve, and an outer radial collar or portion 60b extending radially from the axial portion 60a. The radial portion 60b extends radially outwards from the axial portion 60a. The portion 60b extends an axial end of the axial portion 34a.

The flange 30 is mounted radially around the axial portion 60a of the sleeve. The radial portion 30a of the flange is mounted radially around the axial portion 60a. An annular radial gap (not referenced) subsists between the bore of the flange 30 and the axial portion 60a of the sleeve. The axial portion 60a of the sleeve is secured to the inner ring 16 of the bearing. The axial portion 60a of the sleeve forms a fixing portion of the target holder. The axial portion 60a is mounted and secured into the bore 16a of the inner ring of the bearing. More precisely, the axial portion 60a of the sleeve is mounted and secured into the groove 16e of the bore. The axial portion 60a comes into radial contact with the bore 16a.

The flange 30 is axially interposed and clamped between the lateral face 16d of the inner ring and the radial portion 60b of the sleeve. The radial portion 60b axially abuts against the radial portion 30a of the flange.

In this example, the protrusions of the textured area formed on the lateral face 16d of the inner ring come into contact with the radial portion 30a of the flange of the impulse ring 14. The protrusions of the textured area formed on the bore 16a of the inner ring come into contact with the axial portion 60a of the sleeve of the impulse ring.

In the illustrated examples, both the lateral face 16d and the bore 16a of the inner ring comprise a textured area 40, 42. Alternatively, only the lateral face 16d or the bore 16a may comprise a textured area.

Otherwise, as previously mentioned, in the illustrated examples, the first ring of the rolling bearing is the inner ring whereas the second ring is the outer ring. As an alternative, it could be possible to provide a reversed arrangement with the first ring forming the outer ring and the second ring forming the inner ring. In this case, the impulse ring 14 is secured to the outer ring 18, and at least one of the outer surface 18b and the lateral face 18c or 18d of the outer ring is provided with the textured area.

In the illustrated examples, the sensor bearing unit is provided with a rolling bearing comprising one row of rolling elements. Alternatively, the rolling bearing may comprise at least two rows of rolling elements. In the illustrated examples, the rolling elements are balls. Alternatively, the rolling bearing may comprise other types of rolling elements, for example rollers. In another variant, the rolling bearing may also be provided with a sliding bearing having no rolling elements.

In the previous examples, an impulse ring 14 is secured to the inner or outer ring of the bearing which is provided with the textured area(s) 40, 42. Alternatively, the textured area(s) may be provided on the inner or outer ring in order to improve the angular connection with another part, for example a sensor body, a seal, etc.

Figure 7:
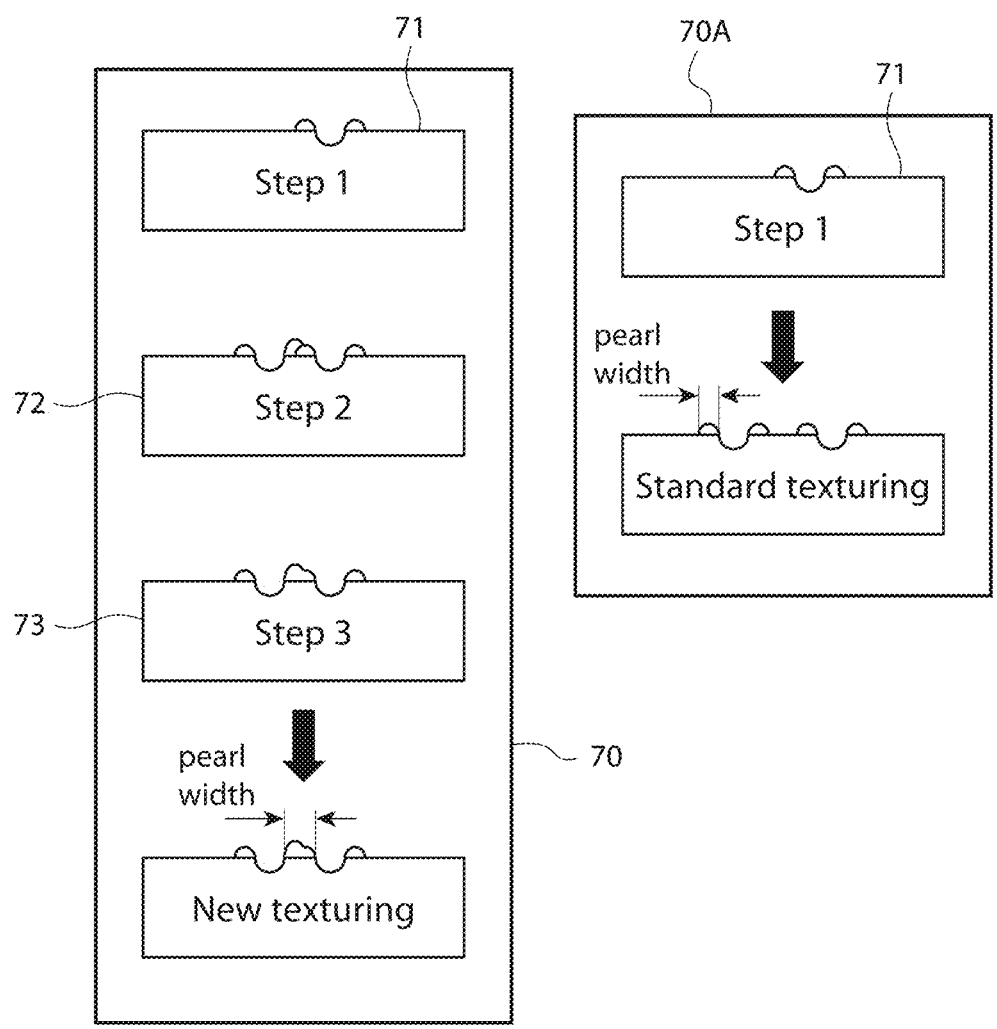
FIG. 7 is a schematic comparison between a texturing process according to an example of the disclosure versus conventional texturing process.

FIG. 7 shows a schematic comparison between an existing conventional texturing method 70A and the new texturing method 70. On one hand existing texturing method uses a single step 71 laser texturing process in order to form a groove flanked by two lateral protrusions on the surface to be textured. Step 71 is repeated all over the surface. It is to be noted that adjacent protrusions do not touch each other as the grooves are formed at a distance big enough to prevent such contact.

On the other hand, the new texturing method 70 uses a three-step texturing process. First step 71 is similar as in the conventional method 70A and is used to form a first groove flanked by two lateral protrusions on the surface to be textured. A second step 72 is used to form a second groove close to the first one. One should note that the lateral protrusion of the second groove which is closest to the first groove covers in part the closest lateral protrusion of the first groove. In a final third step 73, the two neighboring lateral protrusions that came into contact are now united into a single inner protrusion flanked by the first and second grooves by welding.

What is claimed is:

1. A bearing comprising:
    an outer ring and an inner ring centered on an axis, each of the outer and inner rings having an outer cylindrical surface, an inner cylindrical surface, and lateral faces which axially delimit the outer and inner cylindrical surfaces, wherein the inner cylindrical surface and/or one of the lateral faces of the inner ring comprise a textured area having two parallel first and second grooves extending radially or axially, a single inner protrusion disposed between and along the two parallel first and second grooves, a first lateral outer protrusion disposed alongside the first groove, and a second lateral outer protrusion disposed alongside the second groove, the first and second lateral outer protrusions extending respectively along the first and second grooves, the single inner protrusion has a height different than a height of the first lateral outer protrusion.

2. The bearing according to claim 1, wherein the textured area is formed by local deformation of said cylindrical surface or said lateral face.

3. The bearing according to claim 2, wherein the textured area has a linear shape and extends radially or axially.

4. The bearing according to claim 3, wherein the height of the single inner protrusion of the textured area is bigger than the height of the first lateral outer protrusion and a height of the second lateral outer protrusion.

5. The bearing according to claim 4, wherein a width of the single inner protrusion of the textured area is bigger than a width of the first lateral outer protrusion and a width of the second lateral outer protrusion.

6. The bearing according to claim 5, wherein the heights of the first and second lateral outer protrusions range between 15 µm and 38 µm, and wherein widths of the first and second lateral outer protrusions range between 15 µm and 35 µm.

7. The bearing according to claim 5, wherein the heights of the first and second lateral outer protrusions range between 10 µm and 50 µm.

8. The bearing according to claim 7, wherein the widths of the first and second lateral outer protrusions range between 10 µm and 40 µm.

9. The bearing according to claim 8, wherein the space between the single inner protrusion and any one of the first or second lateral outer protrusions of the textured area, at their top, is less than or equal to 60 µm.

10. The bearing according to claim 1, wherein the textured area has a linear shape and extends radially or axially.

11. The bearing according to claim 1, wherein the height of the single inner protrusion of the textured area is bigger than the height of the first lateral outer protrusion and a height of the second lateral outer protrusion.

12. The bearing according to claim 1, wherein a width of the single inner protrusion of the textured area is bigger than a width of the first lateral outer protrusion and a width of the second lateral outer protrusion.

13. The bearing according to claim 1, wherein the height of the first lateral outer protrusion and a height of the second lateral outer protrusion range between 10 µm and 50 µm.

14. The bearing according to claim 1, wherein a width of the first lateral outer protrusion and a width of the second lateral outer protrusion range between 10 µm and 40 µm.

15. The bearing according to claim 1, wherein the space between the single inner protrusion and any one of the first or second lateral outer protrusions of the textured area, at their top, is less than or equal to 60 µm.

16. A method for manufacturing a bearing of claim 1, comprising the following successive steps:
    forming the first groove of textured area with two first lateral protrusions disposed one on each side of the first groove and extending along said first groove,
    forming the second groove with two second lateral protrusions disposed one on each side of the second groove and extending along said second groove, the second groove is spaced from the first groove so that the second lateral protrusion of the second groove which is closest to the first groove covers in part one of the first lateral protrusions,
    merging by welding the second lateral protrusion that covers in part one of the first lateral protrusion with said one of the first lateral protrusion to form the single inner protrusion.

17. A sensor bearing unit comprising:
    a bearing according to claim 1, and
    an impulse ring provided with a target holder and with a target mounted on the target holder, the target holder being axially mounted against said lateral face of the inner ring and comprising an axial fixing portion secured to the inner ring and coming into radial contact with said inner cylindrical surface of the inner ring.

18. The bearing according to claim 1, wherein the height of the first lateral outer protrusion and a height of the second lateral outer protrusion range between 15 µm and 38 µm.

19. The bearing according to claim 1, wherein a width of the first lateral outer protrusion and a width of the second lateral outer protrusion range between 15 µm and 35 µm.

20. The bearing according to claim 1, wherein the textured area includes two parallel third and fourth grooves extending radially or axially, a second single inner protrusion disposed between and along the two parallel third and fourth grooves, a third lateral outer protrusion disposed alongside the third groove, and a fourth lateral outer protrusion disposed alongside the fourth groove, the third and fourth lateral outer protrusions extending respectively along the third and fourth grooves.

21. The bearing according to claim 1, wherein the inner cylindrical surface and said one of the lateral faces of the inner ring each comprise the textured area.

22. A bearing comprising:
    a first ring and a second ring centered on an axis, each of the first and second rings having an outer cylindrical surface, an inner cylindrical surface, and lateral faces which axially delimit the outer and inner cylindrical surfaces, wherein one of the inner and outer cylindrical surfaces and/or one of the lateral faces of the first ring comprise a textured area having two parallel first and second grooves extending radially or axially, a single inner protrusion disposed between and along the two parallel first and second grooves, a first lateral outer protrusion disposed alongside the first groove, and a second lateral outer protrusion disposed alongside the second groove, the first and second lateral outer protrusions extending respectively along the first and second grooves;

wherein a height of the single inner protrusion of the textured area is bigger than heights of the first and second lateral outer protrusions.

23. The bearing according to claim 22, wherein the textured area is formed by local deformation of said cylindrical surface or said lateral face.

24. The bearing according to claim 22, wherein the textured area has a linear shape and extends radially or axially.

25. The bearing according to claim 22, wherein said one of the inner and outer cylindrical surfaces of the first ring comprises the textured area.

26. The bearing according to claim 22, wherein said one of the lateral faces of the first ring comprises the textured area.

27. The bearing according to claim 22, wherein the textured area includes two parallel third and fourth grooves extending radially or axially, a second single inner protrusion disposed between and along the two parallel third and fourth grooves, a third lateral outer protrusion disposed alongside the third groove, and a fourth lateral outer protrusion disposed alongside the fourth groove, the third and fourth lateral outer protrusions extending respectively along the third and fourth grooves.

28. A bearing comprising:
a first ring and a second ring centered on an axis, each of the first and second rings having an outer cylindrical surface, an inner cylindrical surface, and lateral faces which axially delimit the outer and inner cylindrical surfaces, wherein one of the inner and outer cylindrical surfaces and/or one of the lateral faces of the first ring comprise a textured area having two parallel first and second grooves extending radially or axially, a single inner protrusion disposed between and along the two parallel first and second grooves, a first lateral outer protrusion disposed alongside the first groove, and a second lateral outer protrusion disposed alongside the second groove, the first and second lateral outer protrusions extending respectively along the first and second grooves;

wherein a width of the single inner protrusion of the textured area is bigger than widths of the first and second lateral outer protrusions.

29. The bearing according to claim 28, wherein the textured area is formed by local deformation of said cylindrical surface or said lateral face.

30. The bearing according to claim 28, wherein the textured area has a linear shape and extends radially or axially.

31. The bearing according to claim 28, wherein said one of the inner and outer cylindrical surfaces of the first ring comprises the textured area.

32. The bearing according to claim 28, wherein said one of the lateral faces of the first ring comprises the textured area.

33. The bearing according to claim 28, wherein the textured area includes two parallel third and fourth grooves extending radially or axially, a second single inner protrusion disposed between and along the two parallel third and fourth grooves, a third lateral outer protrusion disposed alongside the third groove, and a fourth lateral outer protrusion disposed alongside the fourth groove, the third and fourth lateral outer protrusions extending respectively along the third and fourth grooves.

34. A bearing comprising:
a first ring and a second ring centered on an axis, each of the first and second rings having an outer cylindrical surface, an inner cylindrical surface, and lateral faces which axially delimit the outer and inner cylindrical surfaces, wherein one of the lateral faces of the first ring comprises a textured area having two parallel first and second grooves extending radially, a single inner protrusion disposed between and along the two parallel first and second grooves, a first lateral outer protrusion disposed alongside the first groove, and a second lateral outer protrusion disposed alongside the second groove, the first and second lateral outer protrusions extending respectively along the first and second grooves, the single inner protrusion has a height different than a height of the first lateral outer protrusion.

35. The bearing according to claim 34, wherein the textured area is formed by local deformation of said cylindrical surface or said lateral face.

36. The bearing according to claim 34, wherein the textured area has a linear shape.

37. The bearing according to claim 34, wherein the height of the first lateral outer protrusion and a height of the second lateral outer protrusion range between 10 µm and 50 µm, and wherein a width of the first lateral outer protrusion and a width of the second lateral outer protrusion range between 10 µm and 40 µm.

38. The bearing according to claim 34, wherein the space between the single inner protrusion and any one of the first or second lateral outer protrusions of the textured area, at their top, is less than or equal to 60 µm.

39. The bearing according to claim 34, wherein the textured area includes two parallel third and fourth grooves extending radially, a second single inner protrusion disposed between and along the two parallel third and fourth grooves, a third lateral outer protrusion disposed alongside the third groove, and a fourth lateral outer protrusion disposed alongside the fourth groove, the third and fourth lateral outer protrusions extending respectively along the third and fourth grooves.

* * * * *